United States Patent [19]

Masaki

[11] Patent Number: 4,654,579
[45] Date of Patent: Mar. 31, 1987

[54] FREQUENCY DIVIDER

[75] Inventor: Kazumi Masaki, Osaka, Japan

[73] Assignee: Ken Hayashibara, Okayama, Japan

[21] Appl. No.: 758,535

[22] Filed: Jul. 24, 1985

[30] Foreign Application Priority Data

| Aug. 17, 1984 [JP] | Japan | 59-170358 |
| Aug. 18, 1984 [JP] | Japan | 59-172169 |
| Aug. 18, 1984 [JP] | Japan | 59-172170 |
| Aug. 18, 1984 [JP] | Japan | 59-172171 |

[51] Int. Cl.$^4$ .............................................. H02J 1/00
[52] U.S. Cl. ...................................... 323/326; 323/242
[58] Field of Search .............. 323/235, 319, 242, 326; 363/85, 100, 128; 307/252 UA

[56] References Cited

U.S. PATENT DOCUMENTS

| 3,691,404 | 9/1972 | Swygert, Jr. | 323/319 X |
| 3,950,657 | 4/1976 | Sheng et al. | 323/319 X |
| 3,958,172 | 5/1976 | Beck | 307/252 UA X |
| 4,256,951 | 3/1981 | Payne et al. | 323/319 X |
| 4,282,422 | 8/1981 | Payne et al. | 323/319 X |
| 4,287,468 | 9/1981 | Sherman | 323/319 X |
| 4,377,739 | 3/1983 | Eckert, Jr. et al. | 323/235 X |

Primary Examiner—Peter S. Wong
Assistant Examiner—Marc S. Hoff
Attorney, Agent, or Firm—Browdy and Neimark

[57] ABSTRACT

The frequency of an alternating current can be divided with a novel frequency divider, comprising a thyristor connected in series to main current circuit; a counting circuit (e.g. decimal counter or RC-time constant circuit); a trigger circuit for the thyristor, associated with the counting circuit; and a reset circuit. With use of the apparatus, half- or whole-cycle(s) of an alternating current can be supplied to ac appliance at desirable wave intervals.

6 Claims, 20 Drawing Figures

FREQUENCY DIVIDER

FIELD OF THE INVENTION

The present invention relates to a frequency divider.

DESCRIPTION OF THE PRIOR ART

The frequency of conventional ac power, i.e. fifty or sixty hertz, is excessively high for specific ac appliances. For example, ac electric razor cuts off hairs into pieces when hairs are insufficiently inserted between the cutters of the ac electric razer. If the cutters are vibrated ten cycles per second, hairs are cut off when they are sufficiently inserted. The frequency of conventional ac power is excessively high for use in vibrating chair. In order to lower the frequency, so far cycloconverter or other relatively large-scale converter was used.

SUMMARY OF THE INVENTION

Accordingly, the major object of the present invention is to pick up ac sine waves at desirable wave intervals, which are then supplied to load: For example, six or ten hertz ac can be obtained from sixty hertz ac power by picking up every tenth or sixth sine wave respectively.

This object can be attained with an apparatus, comprising a thyristor connected in series to main current circuit; means for counting the wave number of alternating current; a trigger circuit for the thyristor, associated with the counting means; and means for resetting the counting means.

BRIEF DESCRIPTION OF THE DRAWINGS

The present invention will hereinafter be explained with reference to the accompanying drawings.

In the Figures, C indicates capacitance; D, diode; A, trigger circuit; R, resistance; T, transistor; E, waveform-modifier; SCR, reverse-blocking triode thyristor; F, decimal counter; DCR, bidirectional triode thyristor; J, voltage regulator diode; Z, load; P, current-detector; S, switch; and H, transformer.

DESCRIPTION OF THE PREFERRED EMBODIMENTS

Figure 1:
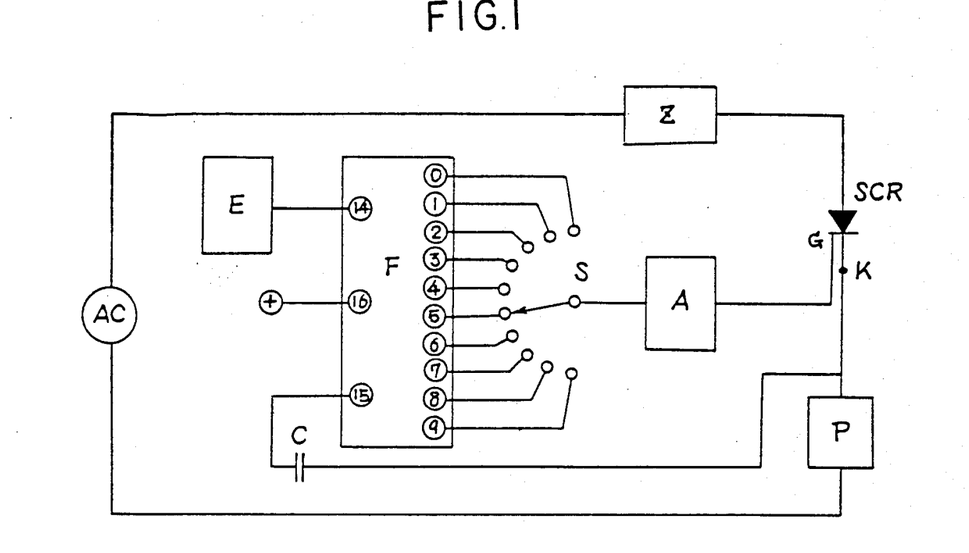
FIG. 1 shows the basic circuit of an embodiment according to the invention.

FIG. 1 shows the basic circuit of an embodiment according to the invention.

In this circuit, the current from ac power source AC comes into IC decimal counter F through waveform-modifier E. Output terminals 0, 1, 2, . . . , 8, 9 can be desirably selected with switch S to couple decimal counter F with trigger circuit A. For example, when output terminal 5 is switched on, trigger circuit A is applied with the fifth sine wave counted from the switching-on. The output of trigger circuit A is applied to gate G of thyristor SCR to bring it into conduction. Thus, ac power source AC is coupled to load Z through bolt thyristor SCR and current-detector P. Resistance and diode are feasible as current-detector P. The voltage between current-detector P is applied to reset terminal 15, in order to return decimal counter F into the first state for subsequent counting.

Figure 2:
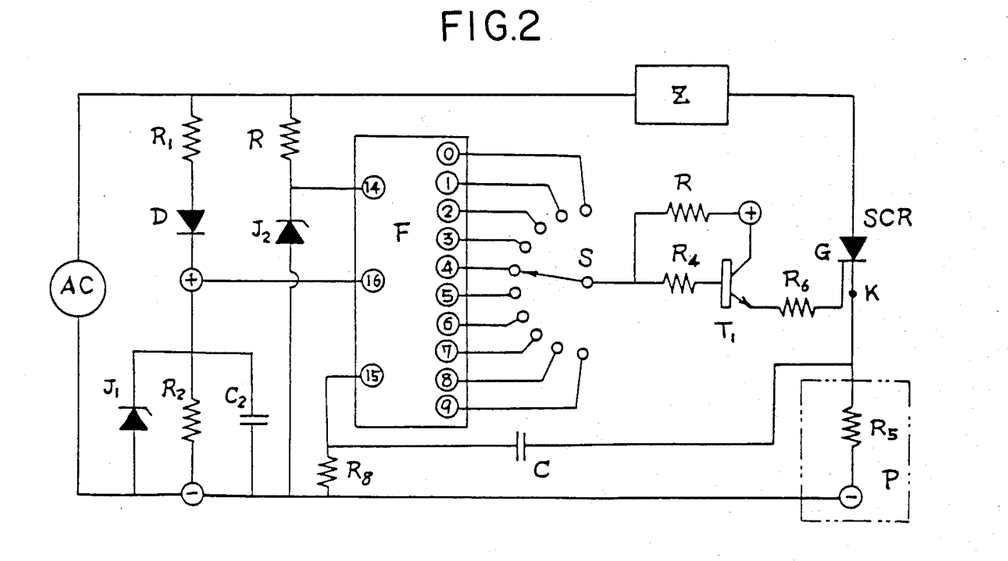
FIG. 2 shows a frequency divider according to the invention.

In the circuit as shown in FIG. 2, ac sine wave is modified by resistance R and voltage regulator diode $J_2$ into voltage-regulated square wave which is then applied to input terminal 14 of IC decimal counter F. Instantly upon switching-on of output terminal 4, IC decimal counter F starts counting, and generates an output signal when the fourth sine wave comes. The current change appearing at resistance $R_3$ instantly produces a voltage signal at the emitter of transistor $T_1$. This voltage signal is applied through resistance $R_6$ to gate G of thyristor SCR to bring it into conduction. Thus, ac current comes into load Z.

Figure 6:
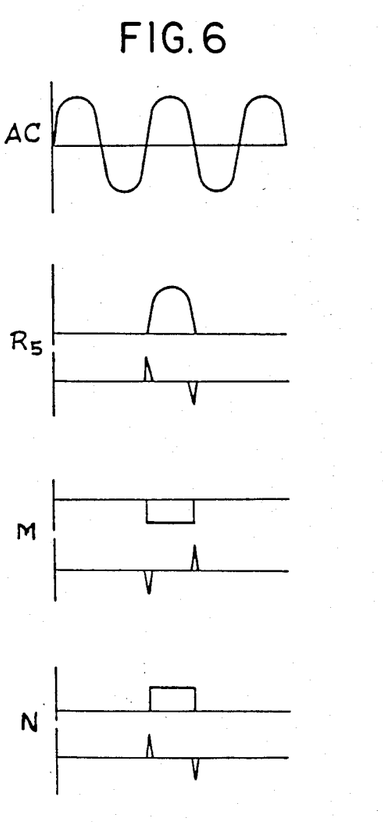
FIG. 6 shows the waveform charts of the circuits as shown in FIGS. 4 and 5.

Simultaneously, resistance $R_5$ receives current to generate a voltage drop with a waveform as shown in upper "$R_5$" chart, FIG. 6. Such voltage drop is differentiated at capacitance C into a pulse wave with a waveform as shown in lower "$R_5$" chart, FIG. 6. Counting with decimal counter F is restarted by applying the pulse wave to reset terminal 15.

By successive repetition these operations, the load circuit can be conducted at desirable wave intervals.

Resistances $R_1$ and $R_2$, diode D, capacitance $C_2$, and voltage regulator diode $J_1$ form a dc power supply.

Figure 3:
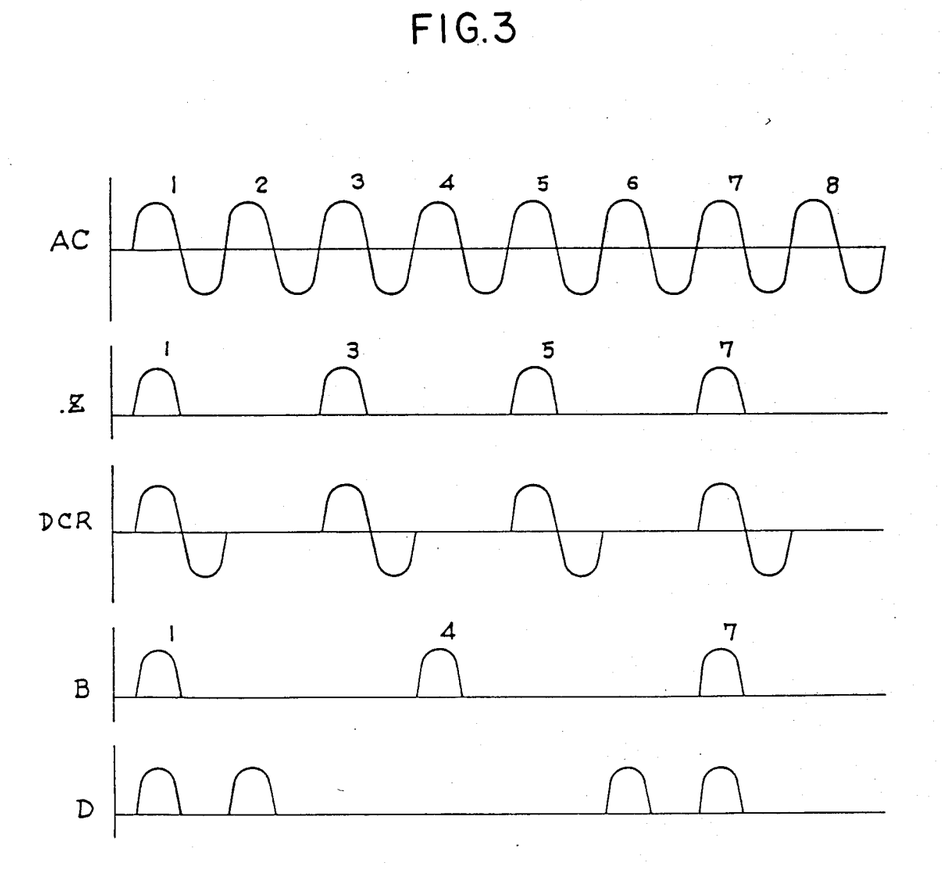
FIG. 3 shows the waveform charts of the circuits as shown in FIGS. 1 and 2.

FIG. 3 shows the current waveforms appearing in these circuits: Chart "AC" shows the waveform appearing at input terminal AC. Chart "Z" shows the waveform of load current wherein ac sine wave is conducted at intervals of two positive half-cycles, e.g. first-, third-, and fifth-half-cycle. Chart "DCR" shows the full-sine wave output by bidirectional triode thyristor. Chart "B" shows a conduction at intervals of two positive half-cycles. By setting the time constant of trigger circuit A at a longer level, successive two positive half-cycles can be conducted at desirable intervals as particularly shown in chart "D".

Figure 4:
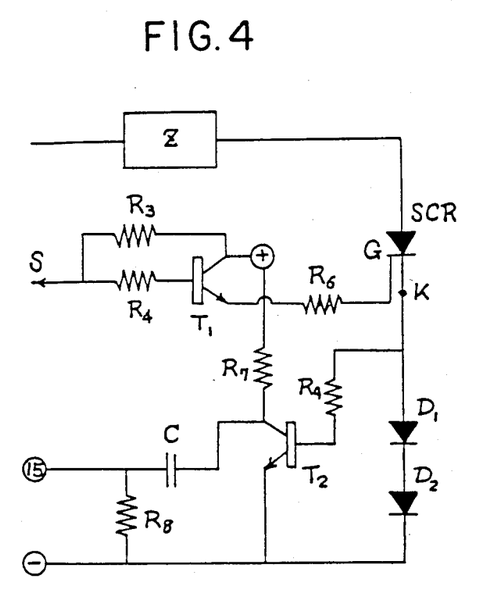
FIGS. 4 and 5 show reset signal generating-circuits wherein diodes are used.

FIG. 4 shows an example wherein series diodes $D_1$ and $D_2$ are inserted in the current circuit to form a reset signal generating-circuit. This example is characterized in that the voltage between series diodes $D_1$ and $D_2$ remains unchanged even when circuit current is varied. Such voltage is amplified by grounded-emitter transistor $T_2$ to obtain square wave as particularly shown in chart "M", FIG. 6. The square wave is differentiated by capacitance C and resistance $R_8$, and the resultant pulse wave is then used to reset IC decimal counter F.

Figure 5:
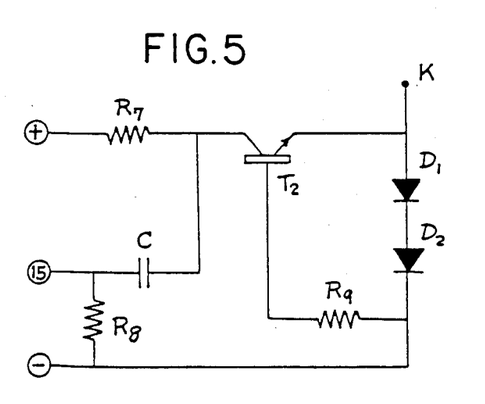

FIG. 5 shows the circuit diagram of a frequency divider wherein the mode of transistor connection is reverse to that of shown in FIG. 4: The voltage between series diodes $D_1$ and $D_2$ is amplified by grounded-base transistor $T_2$ to obtain a pulse wave with a waveform as shown in chart "N", FIG. 6; such pulse being reverse in polarity to that as shown in chart "M". The output signal of the circuit as shown in FIG. 4 is reverse in phase to ac power source because the transistor is emitter-grounded, while with the circuit as shown in FIG. 5 an in-phase signal can be obtained because transistor $T_2$ is base-grounded. These signals are feasible to control the reset time of IC decimal counter F.

Figure 7:
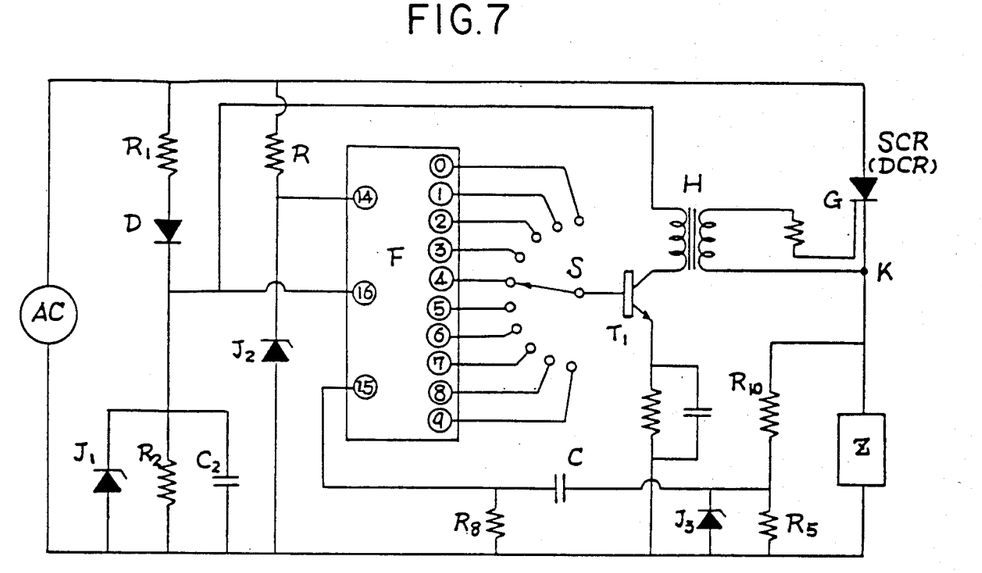
FIG. 7 shows a reset signal generating-circuit wherein load voltage is utilized.

FIG. 7 shows an example wherein the voltage between load Z is supplied to voltage regulator diode $J_3$ through resistance $R_{10}$ and then voltage-regulated. For the use as the reset signal, the voltage is applied to the gate of thyristor SCR while insulating the voltage from the primary circuit with transformer H.

Figure 8:
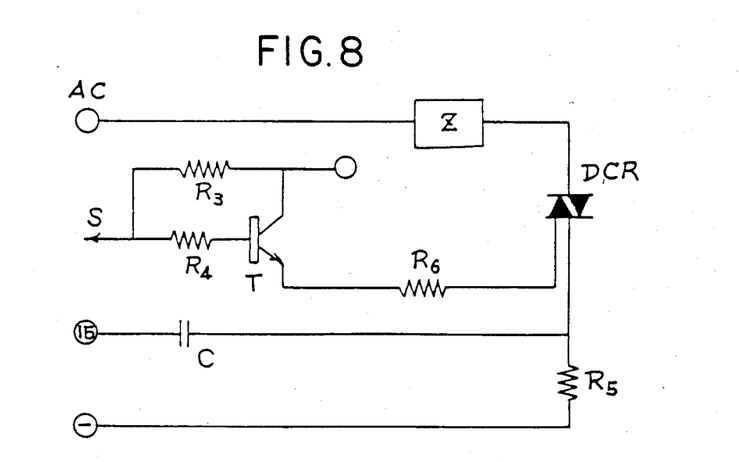
FIGS. 8 and 9 show frequency dividers wherein a bidirectional triode thyristor is used.
Figure 10:
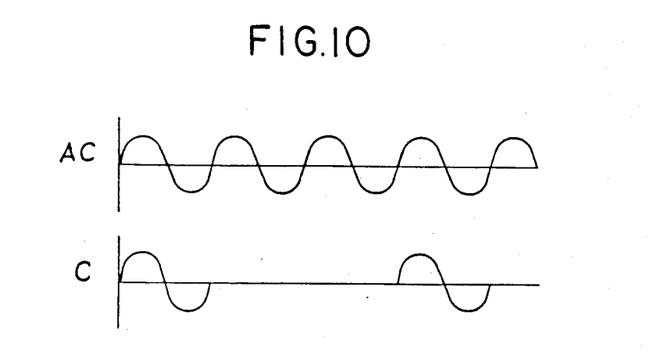
FIG. 10 shows the waveform charts of the circuits as shown in FIGS. 8 and 9.

FIG. 8 shows the circuit diagram of a frequency divider wherein bidirectional triode thyristor DCR is used. The output current waveform is given in chart "C", FIG. 10.

Figure 9:
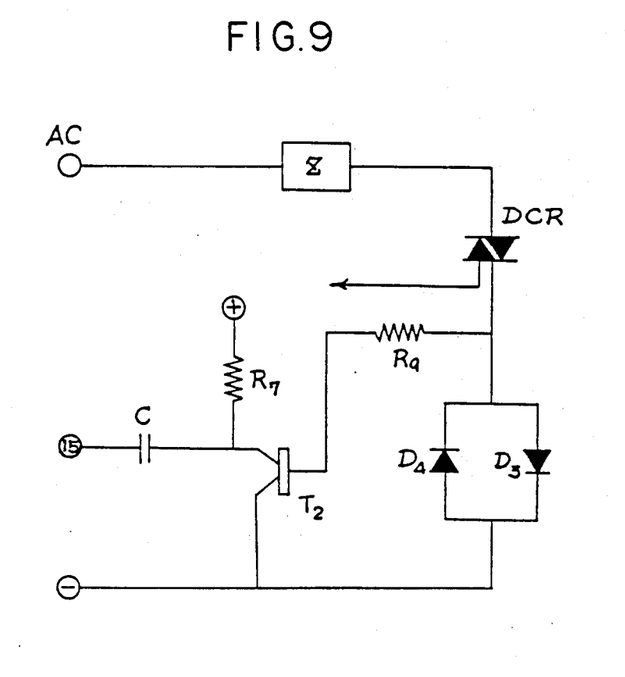

FIG. 9 shows the circuit diagram of a frequency divider using bidirectional triode thyristor DCR, wherein the voltage between diodes $D_3$ and $D_4$ is utilized to reset decimal counter F. Since the thyristor is bidirectional, diodes $D_3$ and $D_4$ are connected in reverse-parallel, and the voltage therebetween is amplified by transistor $T_2$ and then used to reset decimal counter F.

Figure 11:
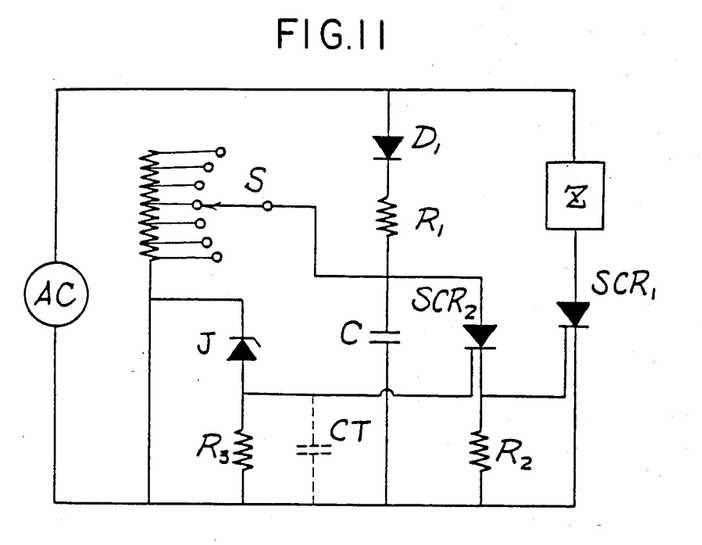
FIG. 11 shows the basic circuit of another embodiment according to the invention.

FIG. 11 shows the basic circuit of another embodiment according to the invention.

In this circuit, ac power source AC charges capacitance C through diode $D_1$ and resistance $R_1$. As shown in chart "A", FIG. 12, the voltage between capacitance C increases every positive half-cycle dependently on the time constant determined by capacitance C and resistance $R_1$. the positive half-cycle from the first- to the fourth-positive half-cycles charge capacitance C. When the fifth positive half-cycle comes, capacitance C is discharged through thyristor $SCR_2$ dependently on the time constant determined by capacitance C and resistance $R_2$. When the voltage between capacitance C reaches a prescribed level, then the partial voltage determined by the ratio of resistances $R_4$ and $R_5$ is applied to voltage regulator diode J or a neon discharge lamp to bring either discharge device into conduction through resistance $R_3$. The voltage drop between resistance $R_3$ triggers thyristor $SCR_2$ to instantly discharge capacitance C through resistance $R_2$, while the voltage drop between resistance $R_2$ triggers thyristor $SCR_1$. Thus, load Z is supplied with a current having a waveform as shown in chart "Z", FIG. 12.

Figure 12:
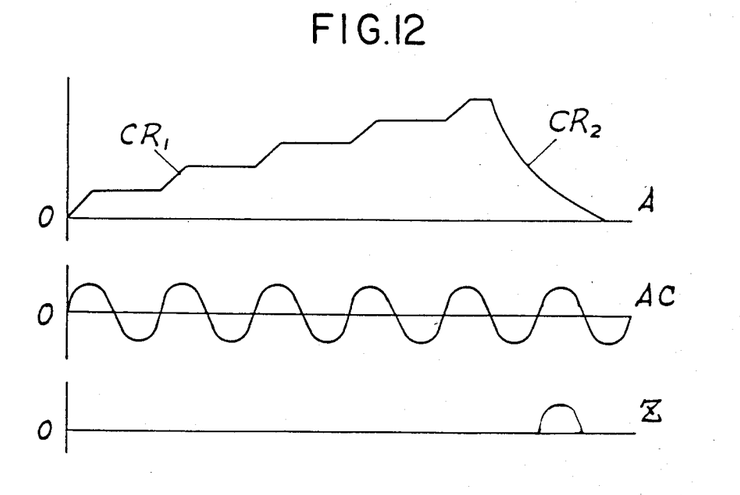
FIG. 12 shows the waveform charts of the circuit as shown in FIG. 11.

Chart "A" in FIG. 12 shows the waveform of an integrated voltage which has been charged in capacitance C through diode $D_1$ and series resistance $R_1$. This voltage increases stepwise dependently on the time constant determined by capacitance C and resistance $R_1$. In such waveform, the voltage reaches the conduction voltage of voltage regulator diode J and current comes into resistance $R_3$ when the fifth positive half-cycle comes. Thus, thyristor $SCR_2$ is triggered, and capacitance C is discharged in accordance with curve "$CR_2$". The voltage drop generated between resistance $R_2$ by the discharge current is applied to the gate of thyristor $SCR_1$ to bring it into conduction. Thus, current comes into load Z.

Figure 13:
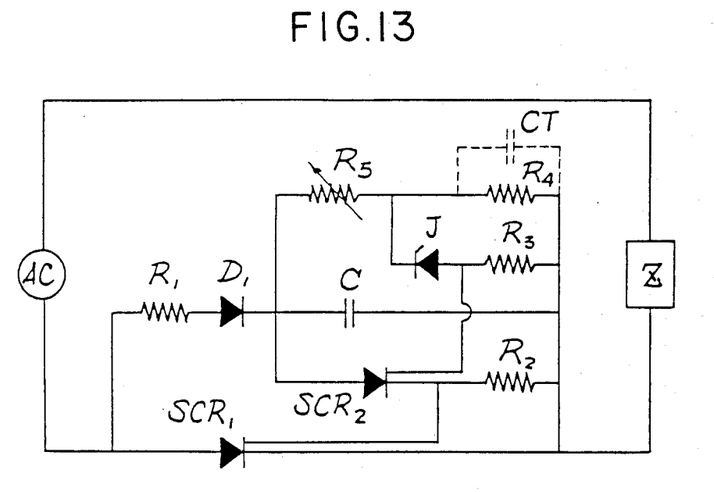
FIG. 13 shows a frequency divider according to the invention.

FIG. 13 shows the circuit diagram of a frequency divider wherein thyristor $SCR_1$ is triggered by utilization of the ac voltage therebetween.

In this circuit, when thyristor $SCR_1$ is not in conduction, ac power source AC is applied to thyristor $SCR_1$ to charge capacitance C through resistance $R_1$ and diode $D_1$ in accordance with curve "$CR_1$" as shown in FIG. 12. The charge voltage between capacitance C is divided by resistances $R_4$ and $R_5$, and the partial voltage between resistance $R_4$ is then applied to voltage regulator diode J. When the voltage between voltage regulator diode J reaches a prescribed level, current comes into voltage regulator diode J to give a voltage drop between resistance $R_3$. This voltage drop is applied to the gate of thyristor $SCR_2$ to bring it into conduction. Consequently, capacitance C is discharged through resistance $R_2$ in accordance with curve "$CR_2$" in FIG. 12. The voltage drop generated at resistance $R_2$ by the discharge triggers thyristor $SCR_1$, connected in the main current circuit, supplies to load Z with a current consisting of positive half-cycles as shown in chart "Z", FIG. 12.

Capacitance $C_T$ in FIG. 11 circuit may be used as the timing capacitance.

Figure 14:
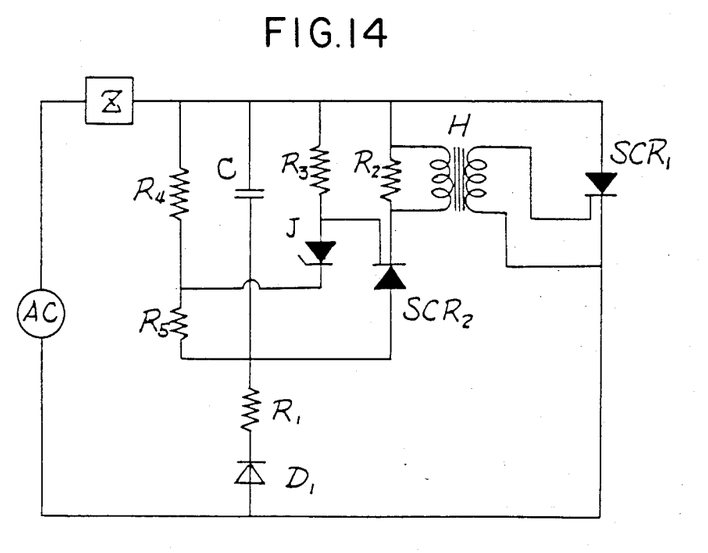
FIG. 14 shows a frequency divider wherein a transformer is used.

FIG. 14 shows an example wherein transformer H is used to supply trigger signal to thyristor $SCR_1$. This example has a merit that ac phase can be freely chosen. Ac power source AC charges capacitance C through load Z, diode $D_1$ (connected in reverse parallel to thyristor $SCR_1$) and resistance $R_1$. Voltage regulator diode is arranged in such a manner that the current across it triggers thyristor $SCR_2$, and that its output is applied to thyristor $SCR_1$ through transformer H. Thus, either positive- or negative-half-cycle can be freely conducted by desirably selecting the polarity of either primary- or secondary-coil of transformer H.

Figure 15:
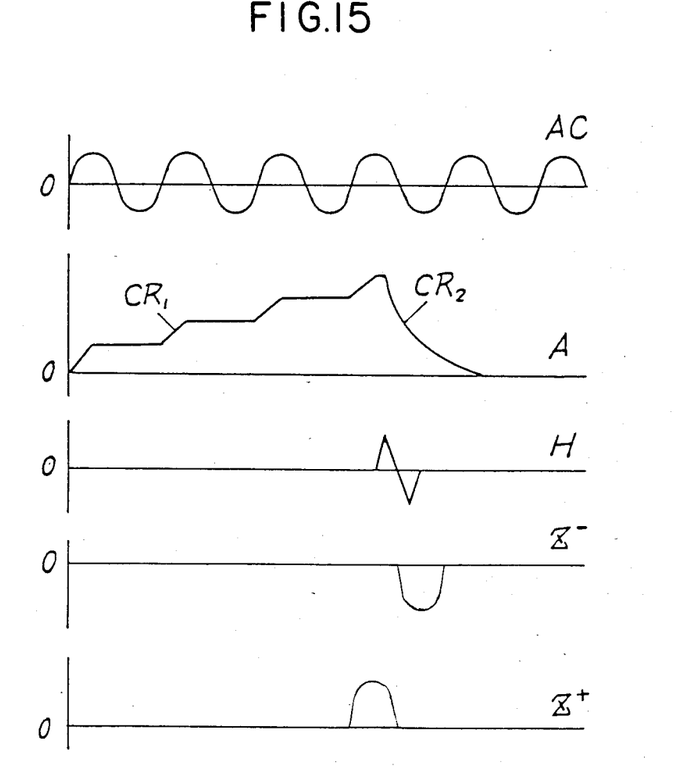
FIG. 15 shows the waveform charts of the example as shown in FIG. 14.

FIG. 15 illustrates such operation. A discharge, as shown with curve "$CR_2$", generates a voltage signal as shown with curve "H" at the secondary coil of transformer H. Since the current across transformer H is in-phase to the voltage between thyristor $SCR_1$, the polarity of load current, i.e. "Z−" or "Z+", can be freely set by desirably selecting the polarity of transformer H.

Figure 16:
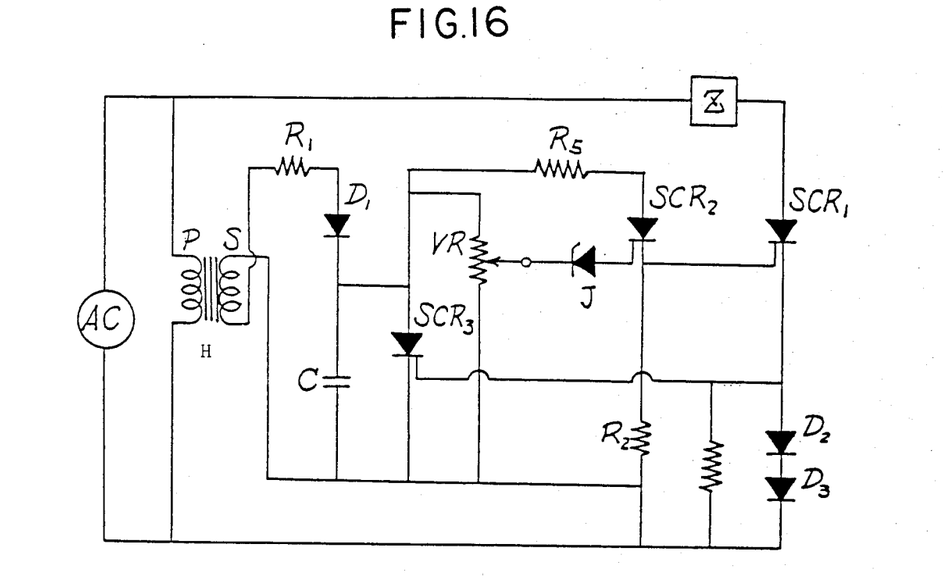
FIG. 16 shows the basic circuit of still another embodiment according to the invention.

FIG. 16 shows the basic circuit of still another embodiment.

Figure 17:
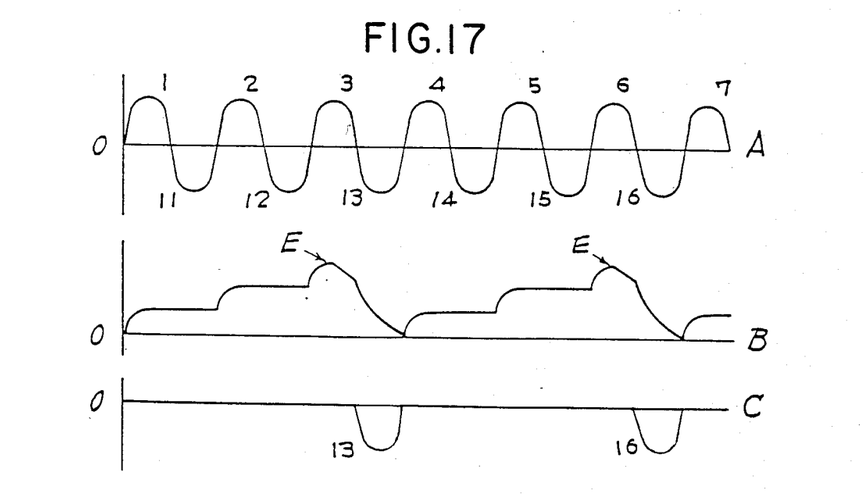
FIG. 17 shows the waveform charts of the circuit as shown in FIG. 16.

In this circuit, the main current circuit is connected to ac power source AC through load Z, thyristor $SCR_1$, and series diodes $D_2$ and $D_3$. The primary coil of transformer H is connected to ac power source AC, while the secondary coil is connected in reverse polarity to ac power source AC to charge capacitance C through resistance $R_1$ and diode $D_1$. As shown in FIG. 17, the charge voltage between capacitance C is increased stepwise, and then divided by variable resistance VR. When the partial voltage reaches the conduction voltage of voltage regulator diode J, thyristor $SCR_2$ is triggered and capacitance C is discharged through resistance $R_5$, thyristor $SCR_2$, and resistance $R_2$ connected in series. Thus, the circuit current continuously generates a voltage drop at resistance $R_2$. Such voltage drop brings thyristor SCR$_1$, connected with the main current circuit, into conductive state, and thyristor SCR$_1$ stands ready for the next cycle.

Chart "A" in FIG. 17 shows the waveform of ac power source AC, wherein symbols 1, 2, 3, ..., and 7 indicate positive half-cycles, while symbols 11, 12, 13, ..., and 17 indicate negative half-cycles. As shown in chart "B", FIG. 16, when the voltage between capacitance C reaches level "E" and the partial voltage divided by variable resistance VR increases to the conduction voltage of voltage regulator diode J, the current across voltage regulator diode J conducts thyristor SCR$_2$, followed by discharge of capacitance C through resistance R$_5$ to retain conduction. Although the voltage drop generated between resistance R$_2$ by the discharge current conducts in part the gate of thyristor SCR$_1$ connected with the main current circuit, thyristor SCR$_1$ connected with the main current circuit is still not triggered because the node voltage of thyristor SCR$_1$ remains negative. Thus, thyristor SCR$_1$ stands ready for the next negative half-cycle, i.e. those as shown in chart "A" with symbols 13 and 16.

Instantly after application of negative half-cycles 13 and 16 to the anode of thyristor SCR$_1$, load Z is applied with these negative half-cycles in a manner as shown in FIG. 17 with chart "C". The current across the main current circuit generates at series diodes D$_1$ and D$_2$ a voltage drop which then triggers thyristor SCR$_3$ to instantly discharge capacitance C. Thus, the whole circuit is resetted.

By successive repetition of these operations, an ac current with a desirable frequency can be supplied to load.

Figure 18:
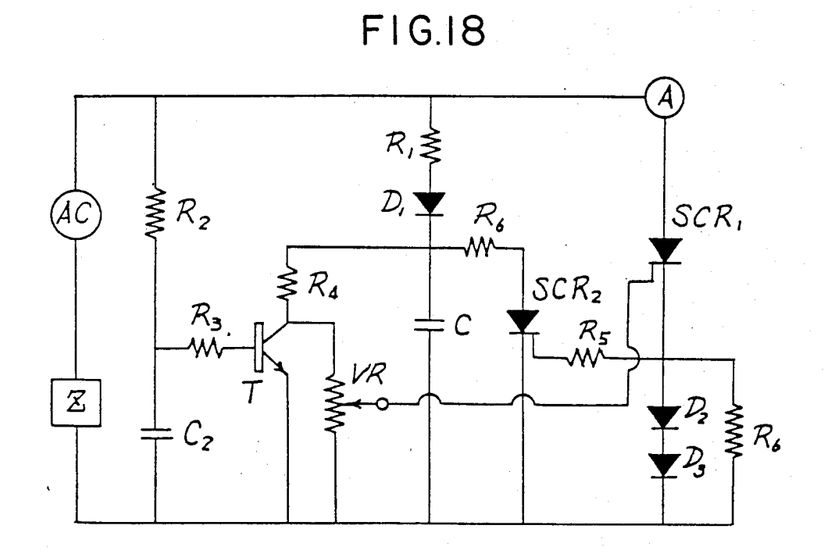
FIG. 18 shows the basic circuit of further embodiment according to the invention.

FIG. 18 shows the basic circuit of further embodiment according to the invention.

Figure 19:
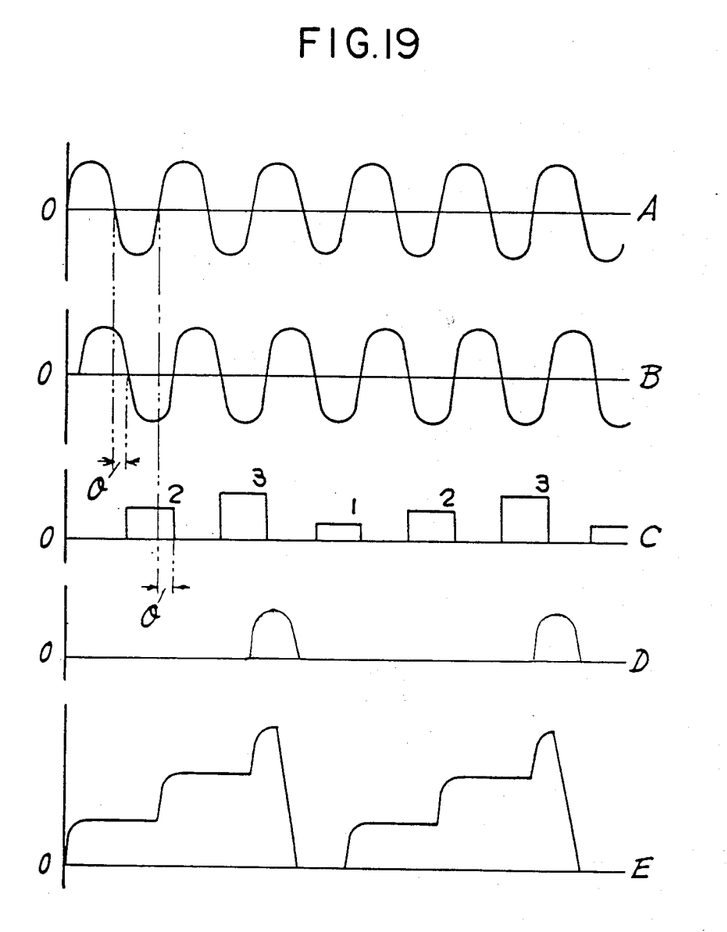
FIG. 19 shows the waveform charts of the circuit as shown in FIG. 18.

In this circuit, ac power source AC is appropriately phase-shifted by the circuit consisting of resistance R$_2$ and capacitance C$_2$. The phase-shifted voltage is applied to the base of grounded-emitter transistor T through resistance R$_3$. FIG. 19 illustrates these operations. Chart "A" in FIG. 19 shows the alternating waveform of ac power source AC. Chart "B" indicates the ac power source AC is phase-shifted by $\theta$. When the phase-shifted voltage is applied to transistor T through R$_3$, then the output waveform at the collector is changed as shown in FIG. 19 with chart "C". A large input signal comes into transistor T to give a saturated waveform. The collector output of transistor T is supplied to the gate of thyristor SCR$_1$, connected with the main current circuit, through variable resistance VR. Thus, a current with a waveform as shown with chart "D" comes into load Z.

The integrating circuit consisting of series resistance R$_1$, diode D, and capacitance C is arranged to form dc power supply for transistor T. The time constant determined by series resistance R$_1$ and capacitance C is associated with the swiching-timing of the current circuit: Capacitance C is charged in accordance with the time constant determined by series resistance R$_1$ and capacitance C. As shown in in chart "E", FIG. 19, positive half-cycles stepwise increase the charge voltage between capacitance C. When the voltage reaches a prescribed level, the output voltage of transistor T is supplied to the gate of thyristor SCR$_1$ through variable resistance VR in a manner as shown in FIG. 19. In the waveform as shown in chart "C", variable resistance VR is set in such a manner that thyristor SCR$_1$ is triggered when the third positive half-cycles comes. By desirably adjusting variable resistance VR, ac sine waves can be conducted, e.g. every cycles, every second cycles, or every third cycles.

If the output of transistor T is set in such a manner that thyristor SCR$_1$ is triggered every third cycles, then a divided ac current with a waveform as shown in chart "D" comes into load Z. Such current generates a voltage between series diodes D$_2$ and D$_3$ connected in series to thyristor SCR$_1$, and the voltage is then applied to thyristor SCR$_2$. Thyristor SCR$_2$ instantly discharges capacitance C through R$_6$ to give a waveform as shown in chart "E", FIG. 19. Thus, the whole circuit is resetted.

By successive repetition of operations, the main current circuit is continually conducted.

Figure 20:
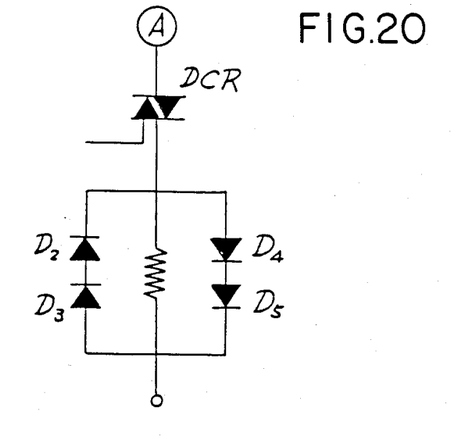
FIG. 20 shows an example wherein a bidirectional triode thyristor is used.

FIG. 20 shows an example wherein bidirectional triode thyristor DCR is used to conduct whole cycles.

The frequency divider according to the invention is simple and usable, if necessary, in combination with half wave- or full wave-rectifier, to supply 1–120 hertz ac to ac appliances from lamp wire. As in the case of ac electric razor, electric hair clipper, and vibrators as disclosed in Japan Patent Application Nos. 67,013/84 and 69,929/84, the frequency divider according to the invention can be favorably used for ac appliances wherein an alternating frequency lower than that of conventional ac power is desirable.

Having described the invention according to the embodiments shown in the accompanying drawings, it is my intention that the invention be not limited by any of the details of description, but rather be construed broadly within its spirit and scope as set out in the accompanying claims.

I claim:

1. A device for dividing the frequency of an alternating current, comprising:
   (a) a first thyristor having a gate and a main current path connected in series with an ac source through a load;
   (b) a variable resistor, said variable resistor being set in such a manner that the half- or full-wave of said ac source is allowed to pass through said main current path of said first thyristor at desirable intervals;
   (c) a grounded-emitter transistor operated under saturated conditions and having a base and a collector, said collector being connected to said gate of said first thyristor through said variable resistor;
   (d) a phase-shifting circuit having an input terminal connected to said ac source, and an output terminal connected to said base of said grounded-emitter transistor;
   (e) an RC-integrating circuit having means, connected with said ac source for electrifying said grounded-emitter transistor;
   (f) a current-sensing means for sensing the current across said load, said current-sensing means being connected in series with said load; and
   (g) a second thyristor having a gate and a main path connected with said RC-integrating circuit, said gate of said second thyristor being connected with said current-sensing means for discharging said electrifying means of said RC-integrating circuit in response to the voltage drop across said current-sensing means to reset said device.

2. The device of claim 1, wherein said first thyristor is a reverse-blocking triode thyristor.

3. The device of claim 1, wherein said first thyristor is a bidirectional triode thyristor.

4. The device of claim 1, wherein said load is an electric motor.

5. The device of claim 1, wherein said current-sensing means is composed of diodes.

6. The device of claim 1, wherein said electrifying means comprises a capacitor.

* * * * *